July 9, 1929.　　　　L. ROUANET　　　1,720,094

SHOCK ABSORBER

Filed June 4, 1925

Inventor
Louis Rouanet
By Marks & Clerk
Attorneys

Patented July 9, 1929.

1,720,094

UNITED STATES PATENT OFFICE.

LOUIS ROUANET, OF IVRY-PORT, FRANCE, ASSIGNOR TO COMPAGNIE D'APPLICATIONS MECANIQUES, OF IVRY-PORT, FRANCE, A FRENCH COMPANY.

SHOCK ABSORBER.

Application filed June 4, 1925, Serial No. 34,944, and in France July 17, 1924.

The present invention relates to shock absorbers of the type comprising a set of external shells and a set of interior shells held together by means of an assembling bolt whilst pressed by a central or internal spring, friction element or elements being interposed between the said shells.

The invention has for its object improvements in or relating to devices of that kind which improvements consist:

(1) In combining the sets of shells—whilst at the same time interposing friction elements—with supplementary or additional shells, preferably but not necessarily of even number, of the same standard as the shells used in the original shock absorber, so as to obtain a more effective and reinforced device the damping action of which for the oscillating movements of the suspension springs is increased relative to that of the original device, proportionally to the number of the additional shells, the method of mounting the supplementary shells being such that, as far as the torsional and bending stresses are concerned, the stiffness of the reinforced shock absorber may be kept equal to that of the original device, the additional arm or arms forming the extensions of the supplementary shells being connected for this purpose permit a certain amount of play of any one of the securing arms of the original device.

(2) In forming the connection between the arm or arms forming the extensions of one or all of the additional shells, and the corresponding arm of the original device, so as to obtain a progressively increasing damping action, the additional shell or shells acting only when a certain angular displacement has taken place between the sets or shells of the original device, the operation of the additional shell or shells being preferably controlled by means of spring like members, so that no noise or shocks are produced.

Other features of the invention will appear more clearly from the following description with reference to examples of preferred constructions represented in the accompanying drawings, in which.

Figure 1:
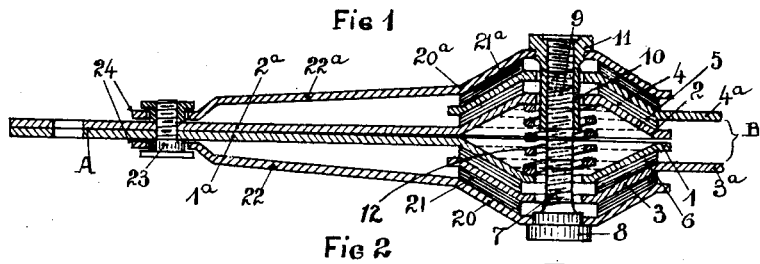
Fig. 1 is a side view, in section, of a reinforced shock absorber according to the invention.
Figure 2:
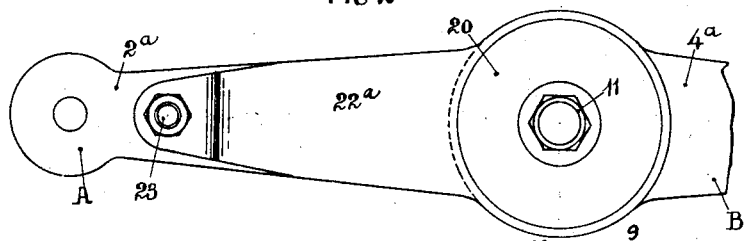
Fig. 2 is an elevation of the same device.

In the arrangement shown in Figs. 1 and 2, two supplementary shells 20 and $20^a$ have been added to the original type of shock absorber composed of shells 1, 2, 3, and 4 between which friction elements 5 and 6 are interposed, the supplementary shell being made according to the same standards as each of the shells 1, 2, 3 and 4. Two friction elements 21 and $21^a$ of material having a suitable coefficient of friction and similar to the elements 5 and 6 are respectively interposed between the shells 3 and 20 and the shells 4 and $20^a$.

The assembly is obtained by means of a central axis or bolt 7, the head 8 of which bears on one of the supplementary shells, the nut 10, screwed onto the threaded end 9, bearing by the head 11, on the other supplementary shell spring 12 indicated in dotted lines in Fig. 1 coiled around the bolt 7, is arranged within the chamber formed by the set of shells 1 and 2, forcing the latter against the shells 3 and 4 and the interposed linings, the pressure being transmitted to the supplementary shells 20 and $20^a$, through the linings 21 and $21^a$.

The supplementary shells 20 and $20^a$ are respectively provided with arms 22 or $22^a$ integral with and secured to the corresponding shell and by means of which they are held at 23 on the shock absorber arm A, a certain play being preferably provided at 24 so that the stiffness of the said arm A will not be modified.

A device, the damping action of which is much greater than that of the original apparatus, is thus provided, while the stiffness of same as regard the bending and torsional stresses may be maintained the same, the said torsional and bending actions being absorbed solely by the arm to which the arms of the supplementary shells are attached, on account of the lateral play provided in the connection.

Moreover, the reinforced shock absorber retains all the other advantages of the original device, the supplementary shells 20 and $20^a$ being always guided in all directions by their bearing parts, any wear which may take place, and which is indicated by a separation of the shells of the interior set under the action of the internal spring, remaining always visible.

It will be evident that the number of supplementary shells may be greater than two, the damping action being proportional to the number of shells used, the other conditions remaining the same.

Figure 3:
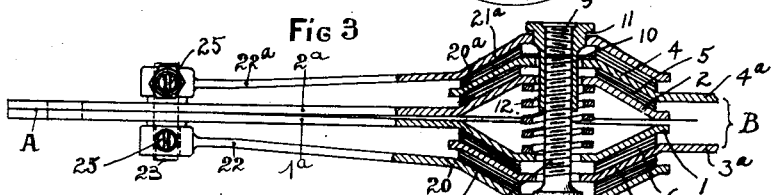
Fig. 3 is a view with parts in section similar to that of Fig. 1, showing the arrangement of the arms of the supplementary shells to obtain elastically a progressive damping action.
Figure 4:
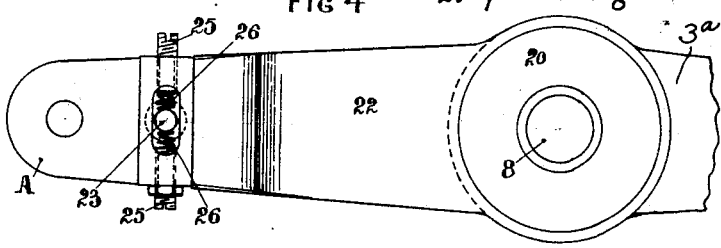
Fig. 4 is an elevation of the arrangement shown in Fig. 3.

In Figs. 3 and 4, the arrangement is such that the supplementary shells 20 and 20ᵃ are moved when the shells 1 and 2 have taken a certain angular displacement relative to the shells 3 and 4. To this end the shells 20 and 20ᵃ are connected to the arm A through the intermediary of stops 25, adjustable or not, acting preferably on springs 26 bearing on the arm A by the intermediary of the axis 23. The action of the supplementary shells thus takes place with a certain delay and gradually.

Claims:

1. In a shock absorber adapted for damping the oscillations of motor vehicle springs, a pair of internal shells, extensions carried by said shells constituting one of the fastening elements of the device, a pair of external shells disposed outwardly of the internal shells, extensions carried by the external shells constituting the other fastening element of the device, a set of shells arranged externally of the external shells, extensions carried by the third mentioned shells secured to the extensions of the internal shells, friction elements freely mounted between the several adjacent shells, a fastening bolt passing centrally through the several shells, and a spring coiled about the bolt internally of the shells and tending to press the latter to compress the friction elements.

2. A shock absorber as claimed in claim 1 characterized by the provision of resilient connecting means interposed between the first and third mentioned extensions, said means including springs acting to cushion the angular displacements of one of the extensions with respect to the other and to cause one of said extensions to follow the movement of the other only after a predetermined displacement thereof.

3. A shock absorber as claimed in claim 1 characterized in that the connection between the extensions of the third mentioned shell and the extension of the internal shell permits of a certain play in the transverse direction.

LOUIS ROUANET.